(12) United States Patent
Chiang et al.

(10) Patent No.: US 10,198,798 B2
(45) Date of Patent: Feb. 5, 2019

(54) FILTERING DEVICE AND FILTER METHOD OF THE SAME

(71) Applicant: Realtek Semiconductor Corporation, Hsinchu (TW)

(72) Inventors: Hao-Tien Chiang, Taipei (TW); Tsung-Hsuan Li, Taichung (TW); Shih-Tse Chen, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 15/489,756

(22) Filed: Apr. 18, 2017

(65) Prior Publication Data

US 2017/0301071 A1 Oct. 19, 2017

(30) Foreign Application Priority Data

Apr. 19, 2016 (TW) .............................. 105112177 A

(51) Int. Cl.
*G06K 9/00* (2006.01)
*G06T 5/20* (2006.01)
*G06T 5/00* (2006.01)

(52) U.S. Cl.
CPC ............... *G06T 5/20* (2013.01); *G06T 5/002* (2013.01); *G06T 5/008* (2013.01); *G06T 2207/10024* (2013.01); *G06T 2207/20032* (2013.01)

(58) Field of Classification Search
None
See application file for complete search history.

(56) References Cited

U.S. PATENT DOCUMENTS

| 8,009,210 B2* | 8/2011 | Matsushima | H04N 5/217 348/241 |
| 8,055,092 B2* | 11/2011 | Kang | G06T 5/20 382/274 |
| 8,305,499 B2* | 11/2012 | Chen | H04N 9/646 348/623 |

(Continued)

OTHER PUBLICATIONS

C. Tomasi et al., "Bilateral Filtering for Gray and Color Images," 1998 IEEE Sixth International Conference on Computer Vision, Jan. 7, 1998.

(Continued)

*Primary Examiner* — Soo Jin Park
(74) *Attorney, Agent, or Firm* — CKC & Partners Co., Ltd.

(57) ABSTRACT

An image-filtering device for filtering an image that includes a pixel difference computing module, an adaptive brightness adjusting module, a weighting computing module and a filter computing module is provided. The pixel difference computing module uses any one of the pixels as a central pixel within a pixel window to compute pixel absolute differences between the central pixel and every pixels within the pixel window. The adaptive brightness adjusting module multiplies each of the pixel absolute differences with an adjusting parameter to generate adjusted pixel absolute differences. The weighting computing module generates weighting values according to the adjusted pixel absolute differences. The filter computing module performs convolution according to the pixel value of each of the pixels within the pixel window and the corresponding weighting values to generate a filtering result of the central pixel.

16 Claims, 5 Drawing Sheets

(56) References Cited

U.S. PATENT DOCUMENTS

| | | | |
|---|---|---|---|
| 9,280,811 B2* | 3/2016 | Levy | G06T 5/009 |
| 9,406,148 B2* | 8/2016 | Zhu | H04N 5/232 |
| 2009/0167904 A1* | 7/2009 | Matsushima | H04N 5/217 |
| | | | 348/241 |

OTHER PUBLICATIONS

Kaiming He, "Guided Image Filtering", 11th European Conference on Computer Vision (ECCV 2010), 2010.

* cited by examiner

101

| 210 | 220 | 230 | 240 | 230 |
| 190 | $P_{00}$ 200 | $P_{01}$ 220 | $P_{02}$ 240 | 220 |
| 140 | $P_{10}$ 150 | $P_{11}$ 70 | $P_{12}$ 140 | 130 |
| 130 | $P_{20}$ 180 | $P_{21}$ 100 | $P_{22}$ 120 | 120 |
| 100 | 120 | 110 | 100 | 110 |

| ... | ... | ... | ... | ... |
| ... | $P_{00}$ 200 | $P_{01}$ 220 | $P_{02}$ 220 | ... |
| ... | $P_{10}$ 150 | $P_{11}$ 150 | $P_{12}$ 130 | ... |
| ... | $P_{20}$ 120 | $P_{21}$ 120 | $P_{22}$ 110 | ... |
| ... | ... | ... | ... | ... |

| ... | ... | ... | ... | ... |
|---|---|---|---|---|
| ... | $D_{00}$ 50 | $D_{01}$ 70 | $D_{02}$ 80 | ... |
| ... | $D_{10}$ 0 | $D_{11}$ 0 | $D_{12}$ 20 | ... |
| ... | $D_{20}$ 30 | $D_{21}$ 30 | $D_{22}$ 40 | ... |
| ... | ... | ... | ... | ... |

| ... | ... | ... | ... | ... |
|---|---|---|---|---|
| ... | $D_{00}'$ 200 | $D_{01}'$ 255 | $D_{02}'$ 255 | ... |
| ... | $D_{10}'$ 0 | $D_{11}'$ 0 | $D_{12}'$ 80 | ... |
| ... | $D_{20}'$ 120 | $D_{21}'$ 120 | $D_{22}'$ 160 | ... |
| ... | ... | ... | ... | ... |

| ... | ... | ... | ... | ... |
|---|---|---|---|---|
| ... | $W_{00}$ $2^1$ | $W_{01}$ $2^0$ | $W_{02}$ $2^0$ | ... |
| ... | $W_{10}$ $2^7$ | $W_{11}$ $2^7$ | $W_{12}$ $2^5$ | ... |
| ... | $W_{20}$ $2^4$ | $W_{21}$ $2^4$ | $W_{22}$ $2^2$ | ... |
| ... | ... | ... | ... | ... |

FIG. 2E

FILTERING DEVICE AND FILTER METHOD OF THE SAME

RELATED APPLICATIONS

This application claims priority to Taiwan Application Serial Number 105112177, filed in Apr. 19, 2016, which is herein incorporated by reference.

BACKGROUND

Field of Disclosure

The present disclosure relates to image processing technologies. More particularly, the present disclosure relates to a filtering device and a filtering method of the same.

Description of Related Art

During the processing of image data, a filter including a specific kernel may needed to perform filtering on the input image to generate an enhanced output image. However, when the noise level of the image is higher, the result of the edge-preserving filter may not be not ideal. Since the value of a central pixel is often not representative, the filter weightings dynamically generated by the edge-preserving filter are not appropriate. Further, a common filter usually generates same weightings based on the same pixel value differences, which is not able to reflect the sense of the human eyes under different environmental brightness. Moreover, a common edge-preserving filter also has a higher computation complexity that is not easier for hardware implementation.

Accordingly, what is needed is a filtering device and a filtering method of the same to address the above issues.

SUMMARY

An aspect of the present disclosure is to provide an image-filtering device for filtering an image with a plurality of pixels each having a pixel value. The image-filtering device includes a pixel difference computing module, an adaptive brightness adjusting module, a weighting computing module and a filter computing module. The pixel difference computing module is configured to use any one of the pixels as a central pixel within a pixel window to compute pixel absolute differences between the pixel value of the central pixel and the pixel value of every pixels within the pixel window. The adaptive brightness adjusting module is configured to multiply each of the pixel absolute differences with an adjusting parameter to generate corresponding adjusted pixel absolute differences, wherein when a reference brightness of a pair of the pixels corresponding to the one of the pixel absolute differences is smaller, the adjusting parameter is larger and when the reference brightness of a pair of the pixels corresponding to the one of the pixel absolute differences is larger, the adjusting parameter is smaller. The weighting computing module is configured to generate weighting values according to the adjusted pixel absolute differences, wherein when one of the adjusted pixel absolute differences is smaller, the corresponding one of the weighting values is larger, and when one of the adjusted pixel absolute differences is larger, the corresponding one of the weighting values is smaller. The filter computing module is configured to perform convolution according to the pixel value of each of the pixels within the pixel window and the corresponding weighting values to generate a filtering result of the central pixel.

Another aspect of the present disclosure is to provide an image-filtering method for filtering an image with a plurality of pixels each having a pixel value. The image-filtering method includes the steps outlined below. Any one of the pixels is used as a central pixel within a pixel window to compute pixel absolute differences between the pixel value of the central pixel and the pixel value of every pixels within the pixel window. Each of the pixel absolute differences is multiplied with an adjusting parameter to generate corresponding adjusted pixel absolute differences, wherein when a reference brightness of a pair of the pixels corresponding to the one of the pixel absolute differences is smaller, the adjusting parameter is larger and when the reference brightness of a pair of the pixels corresponding to the one of the pixel absolute differences is larger, the adjusting parameter is smaller. Weighting values is generated according to the adjusted pixel absolute differences, wherein when one of the adjusted pixel absolute differences is smaller, the corresponding one of the weighting values is larger, and when one of the adjusted pixel absolute differences is larger, the corresponding one of the weighting values is smaller. Convolution is performed according to the pixel value of each of the pixels within the pixel window and the corresponding weighting values to generate a filtering result of the central pixel.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 2A is a diagram of the image in an embodiment of the present disclosure;

FIG. 2B is a diagram of a pre-processed image in an embodiment of the present disclosure;

FIG. 2C is a diagram of the pixel absolute differences computation result generated by the pixel difference computing module according to the pre-processed pixels in an embodiment of the present disclosure;

FIG. 2D is a diagram of the adjusted pixel absolute differences computation result generated by the adaptive brightness adjusting module according to the pixel absolute differences in an embodiment of the present disclosure;

FIG. 2E is a diagram of the weighting values computation result generated by the weighting computing module according to the adjusted pixel absolute differences in an embodiment of the present disclosure.

DETAILED DESCRIPTION

In order to make the objects, technical solutions and advantages of the present disclosure apparent, diagrams in combination of examples are used to describe the present disclosure in further detail. It should be understood that the specific embodiments described herein are merely examples for explaining the present disclosure and are not intended to limit the present disclosure.

Figure 1:
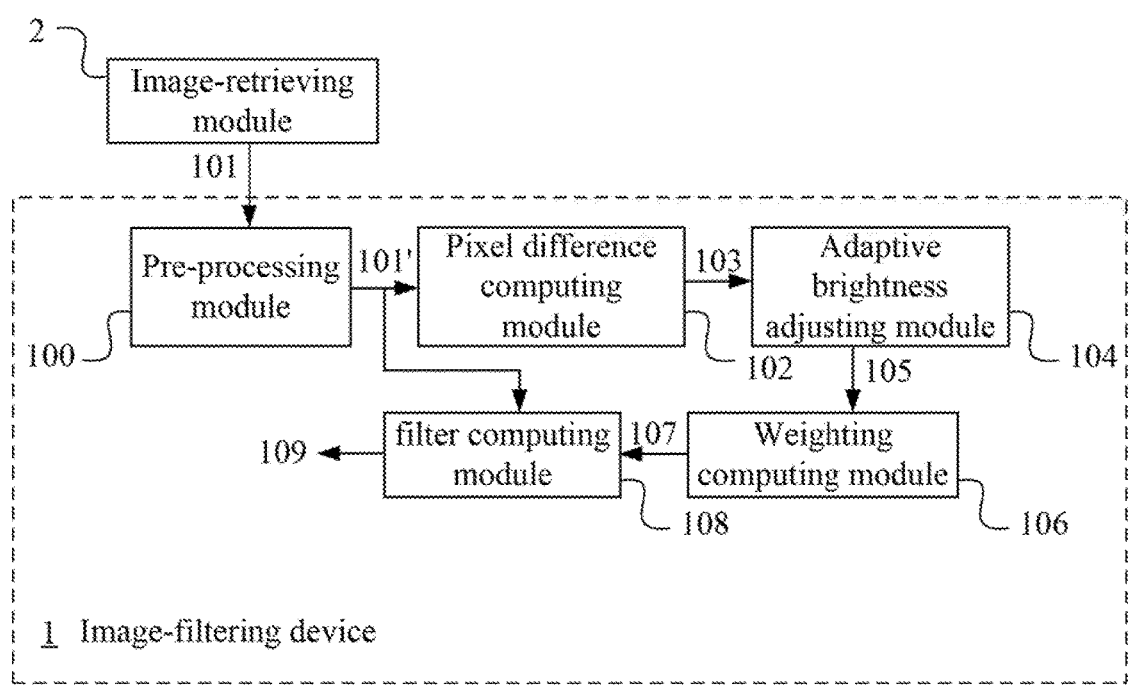
FIG. 1 is a block diagram of an image-filtering device in an embodiment of the present disclosure.

FIG. 1 is a block diagram of an image-filtering device 1 in an embodiment of the present disclosure. The image-filtering device 1 filters an image 101 that includes a plurality of pixels retrieved by an image-retrieving device 2 to generate filtered image. Each of the pixels has a pixel value. The pixel value can be such as, but not limited to a Y, U, or V value in a YUV color space, or a red color (R) value, a green color (G) value and a blue color (B) value in a RGB color space.

In the present embodiment, the image-filtering device 1 includes a pre-processing module 100, a pixel difference computing module 102, an adaptive brightness adjusting module 104, a weighting computing module 106 and a filter computing module 108.

In different embodiments, the image-retrieving device 2 can be such as, but not limited to digital image-retrieving device having charge-coupled device (CCD) light sensors or complementary metal oxide semiconductor (CMOS) light sensors to generate the image 101.

The pre-processing module 100 is configured to receive the image 101 from the image-retrieving device 2 and perform pre-processing on the image 101 according to a noise characteristic of the image-retrieving device 2. The noise characteristic of the image-retrieving device 2 can be obtained based on a training process. In an embodiment, the noise characteristic of the image-retrieving device 2 is a Gaussian form or a random form. Accordingly, the pre-processing performed by the pre-processing module 100 is such as, but not limited to a Gaussian filtering process. In another embodiment, the noise characteristic of the image-retrieving device is an impulse form. The pre-processing performed by the pre-processing module 100 is such as, but not limited to a median filtering process.

Reference is now made to FIG. 2A at the same time. FIG. 2A is a diagram of the image 101 in an embodiment of the present disclosure. It is appreciated that in FIG. 2A, 25 pixels are exemplarily illustrated. The number of the pixels in the image 101 of the present disclosure is not limited thereto.

In an embodiment, the pre-processing is performed on any one of the pixels in the image 101. The pre-processing uses the selected pixel as a central pixel to perform computation with the neighboring pixels within a pixel window having a size of such as, but not limited 3×3.

For example, the image 101 in FIG. 2A includes pixels $P_{00}$-$P_{22}$. The pixels $P_{00}$-$P_{22}$ form a pixel window that has the pixel $P_{11}$ as the central pixel. The pixel values of the pixels $P_{00}$-$P_{22}$ are such as, but not limited to 200, 220, 240, 150, 70, 140, 180, 100 and 120 respectively.

When the pre-processing is the Gaussian filtering process, the pre-processing module 100 averages the pixel values of the pixels $P_{00}$-$P_{22}$ directly or with weights. The generated value becomes the pixel value of the pixel $P_{11}$ after the pre-processing process. Take the average operation as an example, if the pre-processing module 100 averages the pixel values of the pixels $P_{00}$-$P_{22}$ directly, the generated value 157 is the pixel value of the pixel $P_{11}$ after the pre-processing process.

When the pre-processing is the median filtering process, the pre-processing module 100 selects the median of the values of the pixels $P_{00}$-$P_{22}$ as the pixel value of the pixel $P_{11}$ after the pre-processing process. The median filtering process can efficiently remove the impulse noise that can not be removed by the Gaussian filtering process.

In an embodiment, the pre-processing module 100 includes such as, but not limited a circuit of a comparison network to perform the median filtering process. The comparison network circuit performs comparisons each comparing two of the pixels $P_{00}$-$P_{22}$ concurrently. The median of the values of the pixels $P_{00}$-$P_{22}$ can be obtained under a fixed number of comparisons, which is beneficial for parallel processing of the hardware.

Reference is now made to FIG. 2B at the same time. FIG. 2B is a diagram of a pre-processed image 101' in an embodiment of the present disclosure.

Since the median of the pixels $P_{00}$-$P_{22}$ is 150, the pixel value of the $P_{11}$ in the image 101' is 150 after the median filtering process. Similarly, when each of the pixels $P_{00}$-$P_{10}$ and $P_{12}$-$P_{22}$ is used as a central pixel, the median filtering process can be performed thereon with the neighboring pixels. In the present embodiment, the pixel values of the pixels $P_{00}$-$P_{10}$ and $P_{12}$-$P_{22}$ after the pre-processing become 200, 220, 220, 150, 130, 120, 120 and 110 respectively.

The pixel difference computing module 102 receives the pre-processed image 101' and uses any one of the pixels $P_{00}$-$P_{22}$ as a central pixel within a pixel window to compute pixel differences between the pixel value of the central pixel and the pixel value of every pixels within the pixel window. There are many ways to calculate the pixel difference, such as but not limited to one norm, two norms or infinity norm. The method described in the present disclosure is an exemplary description and is not a limitation. For example, when the pixel $P_{11}$ is used as the central pixel to perform computation with the pixels within a 3×3 pixel window, the pixel absolute differences computation result 103 is obtained. The pixel absolute differences computation result 103 includes such as, but not limited to pixel absolute differences $D_{00}$-$D_{22}$. Each of the pixel absolute differences $D_{00}$-$D_{22}$ is the absolute difference between the central pixel $P_{11}$ and each of the pixels $P_{00}$-$P_{22}$ within the pixel window.

Reference is now made to FIG. 2C. FIG. 2C is a diagram of the pixel absolute differences computation result 103 generated by the pixel difference computing module 102 according to the pre-processed pixels in an embodiment of the present disclosure.

In the present embodiment, each of the pixel absolute differences $D_{00}$-$D_{22}$ is the absolute difference between the central pixel $P_{11}$ and each of the pixels $P_{00}$-$P_{22}$ within the pixel window. As a result, according to the pixel values of the pre-processed pixels, the pixel absolute differences $D_{00}$-$D_{22}$ are 50, 70, 80, 0, 0, 20, 30, 30 and 40 respectively. It is appreciated that the computation method is not limited thereto. In different embodiments, the pixel difference computing module 102 can compute the pixel absolute differences $D_{00}$-$D_{22}$ according to a one-norm method or a two-norm method.

Subsequently, the adaptive brightness adjusting module 104 multiplies each of the pixel absolute differences $D_{00}$-$D_{22}$ with an adjusting parameter to generate corresponding adjusted pixel absolute differences computation result 105 that includes such as, but not limited to adjusted pixel absolute differences $D_{00}'$-$D_{22}'$.

Reference is now made to FIG. 2D at the same time. FIG. 2D is a diagram of the adjusted pixel absolute differences computation result 105 generated by the adaptive brightness adjusting module 104 according to the pixel values $P_{00}$-$P_{22}$ in an embodiment of the present disclosure.

In an embodiment, when a reference brightness of a pair of the pixels corresponding to the one of the pixel values $P_{00}$-$P_{22}$ is smaller, the adjusting parameter is larger. When the reference brightness of a pair of the pixels corresponding to the one of the pixel values $P_{00}$-$P_{22}$ is larger, the adjusting parameter is smaller. In an embodiment, the minimal pixel value of the corresponding pair of the pixels is selected as the reference brightness. Further, the adjusting parameter can be determined according to a function related to the reference brightness.

For example, if a pixel value is between 0~255, the adjusting parameter corresponding to a pair of pixels $P_{i,j}$ and $P_{i+m,j+n}$ is a power of 2, such as $2^k$. The amount of the power k is determined by such as, but not limited to a function of:

$$K=F_1[\lfloor(255-\min(P_{i,j},P_{i+m,j+n}))/32\rfloor],$$

in which $F_1[0]=0$, $F_1[1]=1$, $F_1[2]=1$, $F_1[3]=2$, $F_1[4]=2$, $F_1[5]=3$, $F_1[6]=3$ and $F_1[7]=3$.

Take a pair of pixels $P_{00}$ and $P_{11}$ corresponding to the pixel absolute differences $D_{00}$ as an example, the reference brightness is the minimal pixel value thereof, which is 150. The power k of the adjusting parameter is computed by the following equation:

$$K=F_1[\lfloor(255-\min(P_{00},P_{11}))/32\rfloor]=F_1[\lfloor(255-150)/32\rfloor]=F_1[3]=2.$$

As a result, the adjusted pixel absolute difference $D_{00}'$ is the multiplied result of the pixel absolute difference $D_{00}$ and the adjusting parameter $2^k$, which is $D_{00}'=D_{00}\times 2^K=D_{00}\times 2^2=50\times 4=200$. In an embodiment, if the computed adjusted pixel absolute difference exceeds 255, the value of such an adjusted pixel absolute difference, for example, is set to 255.

The adjusted pixel absolute differences $D_{01}'$-$D_{22}'$ can be computed by using the identical method to generate the values of 255, 255, 0, 0, 80, 120, 120 and 160 respectively.

The method described above is equivalent to classify the amount of the pixel values into several sections. Take eight sections as an example, each having the range of 0~31, 32~63, ... and 224~255 that reflect the brightness of the pixels and further perform different degrees of adjustment on the pixel absolute differences based on the brightness of the pixels. In general, the human eyes are sensitive to the change of the brightness within an area having lower brightness. As a result, a greater adjustment is performed on the pixel absolute differences corresponding to the pixels having a lower brightness. A smaller adjustment is performed on the pixel absolute differences corresponding to the pixels having a higher brightness. The requirement of the perception of the human eyes can be satisfied. Further, by using the adjusting parameter realized by the power of 2, the adjusted pixel absolute differences can be computed by simply left-shift the bit of the pixel absolute differences. The computation complexity is greatly reduced. When the adaptive brightness adjusting module 104 is realized by the hardware, it is not necessary to dispose a large amount of multipliers. The cost of the hardware and the computation time can both be reduced.

It is appreciated that the computation method of the adjusting parameter described above is merely an example. In other embodiments, the reference brightness is determined by such as, but not limited to an average pixel value of a pair of pixels or a weighted average pixel value of a pair of pixels. Further, the design of the function can be different depending on practical needs and is not limited thereto.

Subsequently, the weighting computing module 106 determines the amount of the adjusted pixel absolute differences $D_{00}'$-$D_{22}'$ to generate weighting values computation result 107 that includes weighting values $W_{00}$-$W_{22}$.

Reference is now made to FIG. 2E at the same time. FIG. 2E is a diagram of the weighting values computation result 107 generated by the weighting computing module 106 according to the adjusted pixel absolute differences $D_{01}'$-$D_{22}'$ in an embodiment of the present disclosure.

In an embodiment, when one of the adjusted pixel absolute differences $D_{01}'$-$D_{22}'$ is smaller, the corresponding one of the weighting values $W_{00}$-$W_{22}$ is larger. When one of the adjusted pixel absolute differences $D_{01}'$-$D_{22}'$ is larger, the corresponding one of the weighting values $W_{00}$-$W_{22}$ is smaller. In an embodiment, each of weighting values $W_{00}$-$W_{22}$ is a power of 2. In other embodiments, other methods can be used to generate the weighting values. The generation method of the weighting values is not limited thereto.

For example, if a value of the adjusted pixel absolute difference $D_{00}'$ is between 0~255, the corresponding weighting value $W_{00}$ can be $2^s$, and the power s is determined by such as, but not limited to a function of:

$$S=F_2[7-\lfloor D_{00}'/32\rfloor],$$

wherein $F_2[0]=0$, $F_2[1]=1$, $F_2[2]=2$, $F_2[3]=3$, $F_2[4]=4$, $F_2[5]=5$, $F_2[6]=6$ and $F_2[7]=7$.

Take the adjusted pixel absolute differences $D_{00}'$ as an example, the corresponding weighting value $W_{00}$ is computed by the following equation:

$$S=F_2[7-\lfloor 200/32\rfloor]=F_2[7-6]=F_2[1]=1.$$

As a result, the weighting value $W_{00}$ is $2^S=2^1=2$.

The weighting value $W_{00}$-$W_{22}$ can be computed by using the identical method to generate the values of $2^0$, $2^0$, $2^7$, $2^7$, $2^S$, $2^4$, $2^4$ and $2^2$ respectively.

The method described above is equivalent to classify the amount of the pixel values into eight sections each having the range of 0~31, 32~63, ... and 224~255 and generate different weighting values according to the amount of the adjusted pixel absolute differences. It is appreciated that the computation method of the weighting values described above is merely an example. In other embodiments, the design of the function can be different depending on practical needs as well and is not limited thereto.

Subsequently, the filter computing module 108 performs computation according to the image 101' and the weighting values computation result 107. More specifically, the filter computing module 108 performs convolution according to the pixel value of each of the pixels within the pixel window and the corresponding weighting values to generate a filtering result 109 of the central pixel. Take the condition of using the pixel $P_{11}$ as the central pixel as an example, the convolution result performed according to each of the pixels $P_{00}$-$P_{22}$ and the corresponding weighting values is:

$$(200\times 2^1+220\times 2^0+240\times 2^0+150\times 2^7+70\times 2^7+140\times 2^5+180\times 2^4+100\times 2^4+120\times 2^2)/(2^1+2^0+2^0+2^7+2^7+2^5+2^4+2^4+2^2)=38460/328=117.$$

As a result, the filtering result 109, which is the value of the pixel $P_{11}$ after the filtering process, is 117.

Since the weighting values are realized by the power of 2, a large amount of multiplication operation is not necessary in the computation of the filtering result 109 and is replaced by left-shift of the bits. The division is only needed to be performed once to greatly reduce the computation complexity. When the filter computing module 108 is realized by the hardware, it is not necessary to dispose a large amount of multipliers. The cost of the hardware and the computation time can both be reduced.

It is appreciated that for every image 101', the operation process described above is performed on each of the pixels to accomplish the filtering of each of the pixels.

The image-filtering device 1 in the present disclosure uses the pixel difference computing module 102 to compute the pixel absolute differences and uses the adaptive brightness adjusting module 104 to adjust the pixel absolute differences. In one aspect, the weighting computing module 106 can generate the weighting values dynamically according to different contents of the image 101. In another aspect, the adjusted pixel absolute differences can reflect the characteristic of the perception of the human eyes toward the brightness to increase the quality of the filtering process and accomplish the preservation of edges. Further, by using the weighting computing module 106 to generate the weighing values of the power of two, the computation of the filtering process and the complexity of the hardware implementation are greatly reduced. Further, by using the pre-processing of the pre-processing module 100, the image-filtering device 1 can remove the noise by using the method suitable for the noise characteristic of the image-retrieving device 2 to lower the impact of different types of noise.

Figure 3:
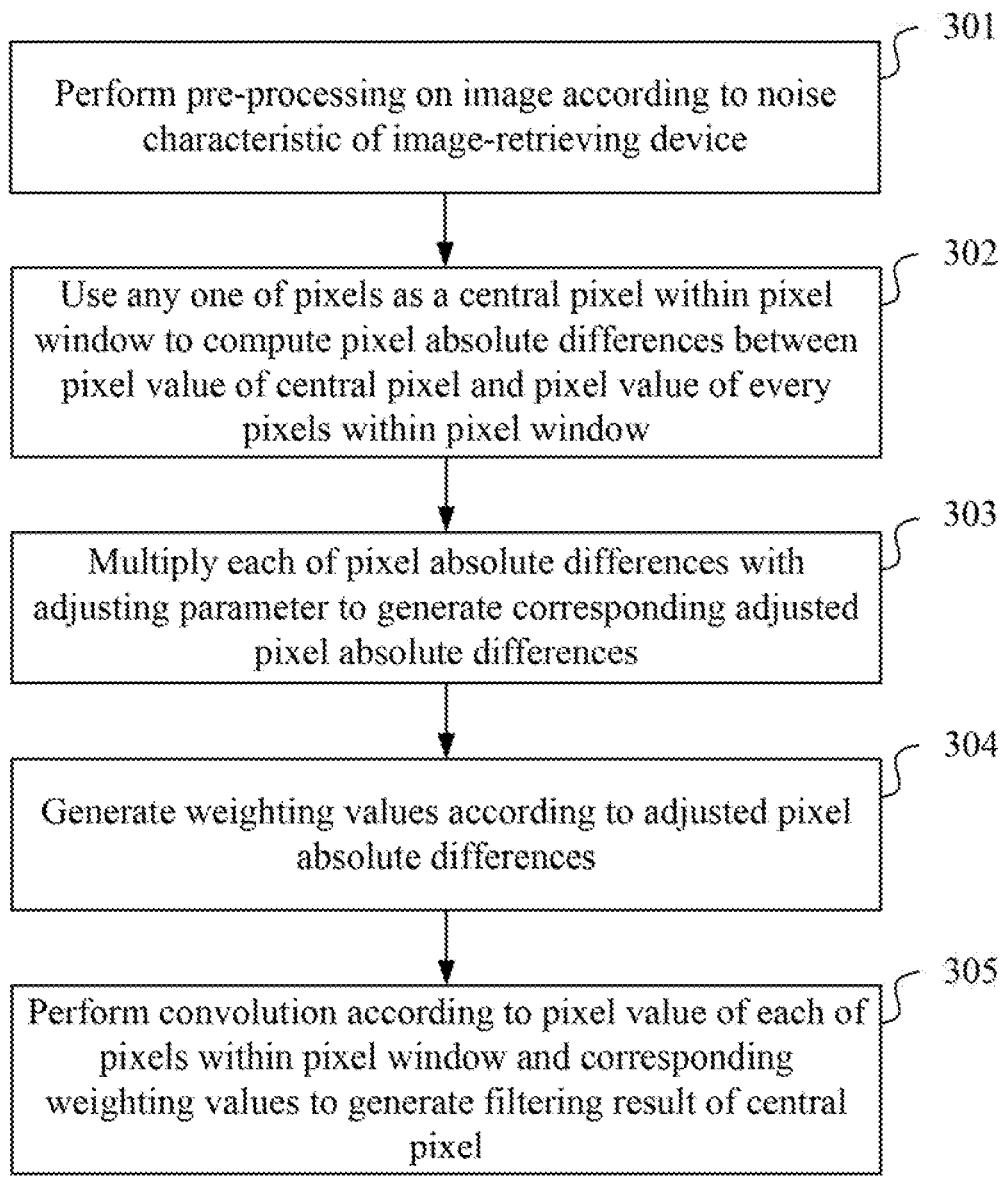
FIG. 3 is a flow chart of an image-filtering method in an embodiment of the present disclosure.

Reference is now made to FIG. 3. FIG. 3 is a flow chart of an image-filtering method 300 in an embodiment of the present disclosure. The image-filtering method 300 can be used in such as, but not limited to the image-filtering device 1 illustrated in FIG. 1. The image-filtering method 300 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 301, the pre-processing module 100 performs the pre-processing on the image 101 according to the noise characteristic of the image-retrieving device 2.

In step 302, the pixel difference computing module 102 uses any one of the pixels, such as the pixel $P_{11}$ in FIG. 2A, as the central pixel within the pixel window to compute pixel absolute differences $D_{00}$-$D_{22}$ between the pixel value of the central pixel $P_{11}$ and the pixel value of every pixels $P_{00}$-$P_{22}$ within the pixel window.

In step 303, the adaptive brightness adjusting module 104 multiplies each of the pixel absolute differences $D_{00}$-$D_{22}$ with the adjusting parameter to generate corresponding adjusted pixel absolute differences $D_{00}'$-$D_{22}'$. When the reference brightness of the pair of the pixels corresponding to the one of the pixel values $P_{00}$-$P_{22}$ is smaller, the adjusting parameter is larger. When the reference brightness of the pair of the pixels corresponding to the one of the pixel values $P_{00}$-$P_{22}$ is larger, the adjusting parameter is smaller.

In step 304, the weighting computing module 106 generates weighting values according to the adjusted pixel absolute differences $D_{00}'$-$D_{22}'$. When one of the adjusted pixel absolute differences $D_{00}'$-$D_{22}'$ is smaller, the corresponding one of the weighting values is larger. When one of the adjusted pixel absolute differences $D_{00}'$-$D_{22}'$ is larger, the corresponding one of the weighting values is smaller. In an embodiment, each of the weighting values is the power of 2.

In step 305, the filter computing module 108 performs convolution according to the pixel value of each of the pixels $P_{00}$-$P_{22}$ within the pixel window and the corresponding weighting values $W_{00}$-$W_{22}$ to generate the filtering result 109 of the central pixel $P_{11}$. It is noted that the pixels $P_{00}$-$P_{22}$ can be the original pixel values or the processed values.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image-filtering device for filtering an image with a plurality of pixels each having a pixel value, comprising:
    a pixel difference computing circuit configured to use any one of the pixels as a central pixel within a pixel window to compute pixel absolute differences between the pixel value of the central pixel and the pixel value of every pixels within the pixel window;
    an adaptive brightness adjusting circuit configured to multiply each of the pixel absolute differences with an adjusting parameter to generate corresponding adjusted pixel absolute differences, wherein when a reference brightness of a pair of the pixels corresponding to the one of the pixel differences is smaller, the adjusting parameter is larger and when the reference brightness of a pair of the pixels corresponding to the one of the pixel absolute differences is larger, the adjusting parameter is smaller;
    a weighting computing circuit configured to generate weighting values according to the adjusted pixel absolute differences, wherein when one of the adjusted pixel absolute differences is smaller, the corresponding one of the weighting values is larger, and when one of the adjusted pixel absolute differences is larger, the corresponding one of the weighting values is smaller; and
    a filter computing circuit configured to perform convolution according to the pixel value of each of the pixels within the pixel window and the corresponding weighting values to generate a filtering result of the central pixel.

2. The image-filtering device of claim 1, further comprising:
    a pre-processing circuit configured to perform a pre-processing on the image according to a noise characteristic of an image-retrieving device that retrieves the image such that the pixel difference computing circuit computes the pixel absolute differences according to the pre-processed image.

3. The image-filtering device of claim 2, wherein when the noise characteristic of the image-retrieving device is an impulse form, the pre-processing is a median filtering process.

4. The image-filtering device of claim 3, wherein the pre-processing circuit comprises a comparison network to perform the median filtering process.

5. The image-filtering device of claim 2, wherein when the noise characteristic of the image-retrieving device is a Gaussian form or a random form, the pre-processing is a Gaussian filtering process.

6. The image-filtering device of claim 1, wherein the pixel difference computing circuit computes the pixel absolute differences according to a one-norm method or a two-norm method.

7. The image-filtering device of claim 1, wherein the reference brightness is a minimal pixel value of the corresponding pair of the pixels.

8. The image-filtering device of claim 1, wherein the adjusting parameter is a power of 2.

9. An image-filtering method for filtering an image with a plurality of pixels each having a pixel value, comprising:
    using any one of the pixels as a central pixel within a pixel window to compute pixel absolute differences between the pixel value of the central pixel and the pixel value of every pixels within the pixel window;
    multiplying each of the pixel absolute differences with an adjusting parameter to generate corresponding adjusted pixel absolute differences, wherein when a reference brightness of a pair of the pixels corresponding to the one of the pixel absolute differences is smaller, the adjusting parameter is larger and when the reference brightness of a pair of the pixels corresponding to the one of the pixel absolute differences is larger, the adjusting parameter is smaller;

generating weighting values according to the adjusted pixel absolute differences, wherein when one of the adjusted pixel absolute differences is smaller, the corresponding one of the weighting values is larger, and when one of the adjusted pixel absolute differences is larger, the corresponding one of the weighting values is smaller; and performing convolution according to the pixel value of each of the pixels within the pixel window and the corresponding weighting values to generate a filtering result of the central pixel.

10. The image-filtering method of claim 9, further comprising:

performing a pre-processing on the image according to a noise characteristic of an image-retrieving device that retrieves the image such that the pixel absolute differences are computed according to the pre-processed image.

11. The image-filtering method of claim 10, wherein when the noise characteristic of the image-retrieving device is an impulse form, the pre-processing is a median filtering process.

12. The image-filtering method of claim 11, wherein the median filtering process is performed by using a comparison network.

13. The image-filtering method of claim 10, wherein when the noise characteristic of the image-retrieving device is a Gaussian form or a random form, the pre-processing is a Gaussian filtering process.

14. The image-filtering method of claim 9, wherein the pixel absolute differences is computed according to a one-norm method or a two-norm method.

15. The image-filtering method of claim 9, wherein the reference brightness is a minimal pixel value of the corresponding pair of the pixels.

16. The image-filtering method of claim 9, wherein the adjusting parameter is a power of 2.

* * * * *